W. M. PROCTOR.
PEA VINE CUTTER AND GATHERER.
APPLICATION FILED JULY 2, 1912.

1,055,224.

Patented Mar. 4, 1913.

Witnesses
Thos. W. Riley
M. Newcomb

Inventor
W. M. Proctor
By W. J. FitzGerald & Co.
Attorneys

UNITED STATES PATENT OFFICE.

WILLIAM M. PROCTOR, OF CHEBOYGAN, MICHIGAN.

PEA-VINE CUTTER AND GATHERER.

1,055,224.  Specification of Letters Patent.  Patented Mar. 4, 1913.

Application filed July 2, 1912.  Serial No. 707,240.

*To all whom it may concern:*

Be it known that I, WILLIAM M. PROCTOR, a citizen of the United States, residing at Cheboygan, in the county of Cheboygan and State of Michigan, have invented certain new and useful Improvements in Pea-Vine Cutters and Gatherers; and I do hereby declare the following to be a full, clear, and exact description of the invention, such as will enable others skilled in the art to which it appertains to make and use the same.

My invention relates to a pea harvesting tool, which is designed particularly for harvesting or gathering pea vines as well as similar vines, when it is desired to take up the same from the ground in a rapid and cleanly manner and my object is to provide a thoroughly reliable and efficient tool of the character specified, which can be cheaply manufactured and which any person can readily use for cutting off the vines close to the surface of the ground and gathering said vines with the pods thereon without loosening or opening any of the pods.

A further object of my invention is to provide means which can be readily employed by the operator without necessitating that he shall occupy a stooped and, consequently, a very exhausting position.

Other objects and advantages will be hereinafter made clearly apparent, reference being had to the accompanying drawings.

Figure 1:
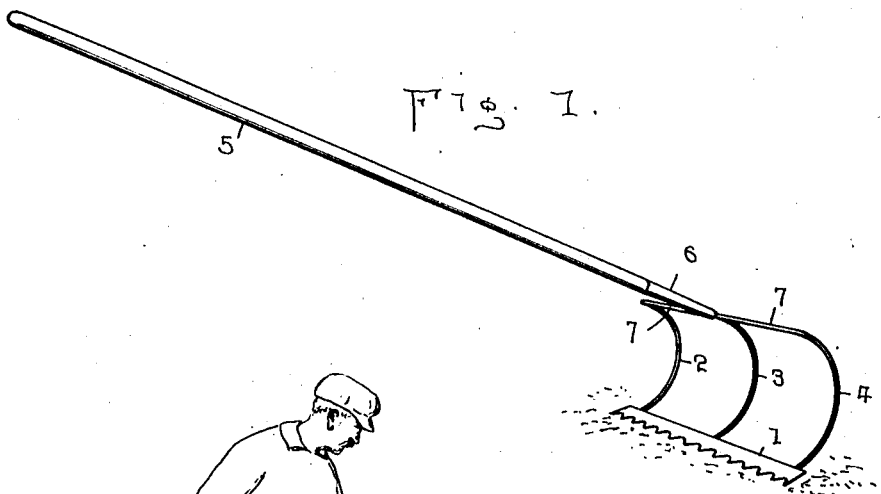
Figure 2:
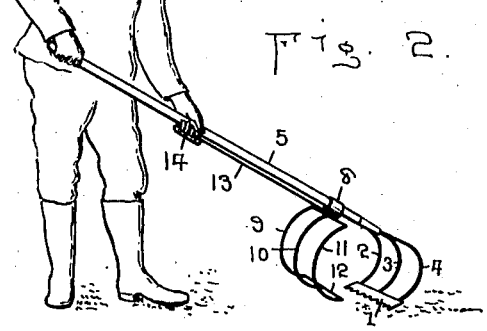
Figure 3:
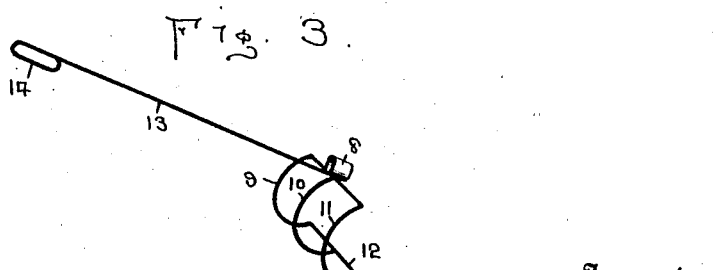

In said drawings, Figure 1 shows the main part of my invention ready for use. Fig. 2 shows my invention as applied to use. Fig. 3 is a detail view showing the vine engaging and gathering device removed from the handle.

For convenience of description the various details and coöperating parts of my invention will be designated by numerals, the same numeral being applied to similar parts throughout the several views.

In materializing my invention I provide a cutting blade of thin, highly tempered steel, provided upon its edge with a series of recesses or serrations, whereby the vines will be severed as by lateral thrust upon the blade, as will be clearly apparent. To the blade 1, I attach a plurality of resilient carrying arms 2, 3 and 4 and it will be observed that the spring arm 3 springs directly from the end of the handle portion 5, which is provided with a ferrule 6 on the end thereof, as shown, said ferrule being designed to receive the ends of the resilient carrying arms 2, 3 and 4, as will be obvious by reference to Fig. 1 of the drawings.

The arms 2 and 4, which are located upon opposite sides of the central arm 3, are each provided with a right angled extension, as indicated by the numeral 7, thus disposing each of the arms 2 and 4 parallel with the middle arm 3, it being understood that said arms may be multiplied in number and spaced so as to prevent the vines from passing between the same.

Designed to fit loosely upon the handle section is the collar 8, which also carries upon its under side a plurality of arms 9, 10 and 11, corresponding in position to the arms 2, 3 and 4, said arms 9, 10 and 11 being connected at their lower ends with the cross bar 12 designed to hold the arms in proper alinement. The collar section 8 is also provided with the controlling handle or rod 13, having a handle section 14, and it is therefore obvious that in gathering the vines, after they have been severed, the arms 9, 10 and 11 may be turned upward until the arms 2, 3 and 4 have gathered a sufficient load, when said arms 9, 10 and 11 may be easily forced downwardly over said arms 2, 3 and 4 which will insure that the vines thus gathered will be reliably held in position and may be bodily lifted and placed in any desired position.

It will be understood that my pea vine gatherer will be useful for a variety of purposes, as in gathering beans and other vines, while the blade 1 will also be useful, as in cultivating the soil, if desired, although I wish to call particular attention to my improved tool as being particularly useful for gathering pea vines and the like. It will be understood that the collar section 8 is loose enough to slip over the handle 5 into desired position, or as quickly removed therefrom.

My improved tool will be found to be thoroughly efficient for the purposes specified and may be very cheaply and expeditiously manufactured and sold at a comparatively small price and the farmer and gardener will find it a most invaluable tool for many purposes, as hereinbefore set forth.

Having thus described the construction and manner of using my invention, further description is deemed unnecessary.

What I claim as new is:

The herein described tool for gathering pea vines and the like, comprising the combination with a handle portion provided with a plurality of resilient arms, and a serrated cutting blade operatively connected to the lower ends of said arms; of an auxiliary vine engaging member carried by the handle and adapted to be adjustably disposed thereon.

In testimony whereof I have signed my name to this specification in the presence of two subscribing witnesses.

WILLIAM M. PROCTOR.

Witnesses:
  WM. N. CROSS,
  JOHN W. WALLER.